(12) United States Patent
Kleiman et al.

(10) Patent No.: US 9,785,655 B2
(45) Date of Patent: Oct. 10, 2017

(54) DYNAMIC MAPS FOR EXPLORING AND BROWSING OF IMAGES

(71) Applicant: Ramot at Tel-Aviv University Ltd., Tel-Aviv (IL)

(72) Inventors: Yanir Kleiman, Savyon (IL); Daniel Cohen-Or, Hod-HaSharon (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 158 days.

(21) Appl. No.: 14/244,103

(22) Filed: Apr. 3, 2014

(65) Prior Publication Data

US 2014/0304278 A1    Oct. 9, 2014

Related U.S. Application Data

(60) Provisional application No. 61/808,258, filed on Apr. 4, 2013.

(51) Int. Cl.
  *G06F 17/30* (2006.01)
  *G06F 3/0484* (2013.01)
  *G06F 3/0485* (2013.01)

(52) U.S. Cl.
  CPC .... *G06F 17/30277* (2013.01); *G06F 3/04842* (2013.01); *G06F 17/30247* (2013.01); *G06F 3/0485* (2013.01)

(58) Field of Classification Search
  CPC .................................................. G06F 17/30056
  See application file for complete search history.

(56) References Cited

U.S. PATENT DOCUMENTS

| | | | | |
|---|---|---|---|---|
| 8,005,823 B1* | 8/2011 | Marshall | ........... | G06F 17/30477 707/713 |
| 8,364,673 B2* | 1/2013 | Chang | ............... | G06F 17/30274 707/728 |
| 2006/0112092 A1* | 5/2006 | Ziou | .................. | G06F 17/30274 707/999.005 |
| 2008/0144943 A1* | 6/2008 | Gokturk | .............. | G06F 17/3025 382/224 |
| 2013/0060766 A1* | 3/2013 | Lin | .................... | G06F 17/30259 707/723 |
| 2014/0188844 A1* | 7/2014 | Kogan | .............. | G06F 17/30274 707/722 |
| 2015/0170333 A1* | 6/2015 | Jing | .................. | G06F 17/30277 345/660 |

* cited by examiner

*Primary Examiner* — Khanh Pham (57) ABSTRACT

A method of mapping a collection of images, or other higher dimensional items including text documents, and three-and-higher dimensional objects, onto a navigable grid for browsing via a user interface comprises obtaining for each of the images a list of nearest neighbor images and similarity scores for each nearest neighbor; placing a first image on a cell within a grid; from a respective list of nearest neighbors of said first image, finding images that maximize a compatibility score with images already placed on the grid and placing resulting images on neighboring cells; and continuing to place further images on the grid until all cells visible to a user are filled with images. As the user pans or zooms the grid, more cells move into the visible area of the screen and are filled with images in the same way.

21 Claims, 5 Drawing Sheets

DYNAMIC MAPS FOR EXPLORING AND BROWSING OF IMAGES

RELATED APPLICATION

This application claims the benefit of priority under 35 USC 119(e) of U.S. Provisional Patent Application No. 61/808,258 filed Apr. 4, 2013, the contents of which are incorporated herein by reference in their entirety.

FIELD AND BACKGROUND OF THE INVENTION

The present invention, in some embodiments thereof, relates to dynamic maps for exploring and browsing images and, more particularly, but not exclusively, to a way of carrying out local exploring and browsing of a large image data set.

In recent years there has been a gigantic increase in the availability of images, videos, and other kinds of high dimensional data. This trend raises the need for tools to explore such vast datasets in a fast and intuitive way. Recently, image search has received much attention in the scientific community and the high-tech industry. A strong focus has been put on developing relevance feedback techniques, which refine search results using a selection of preferred images. At each relevance feedback step, the user is presented with a new set of images based upon past selections. However, the navigation experience with this approach is not continuous and it requires the user to go over a large collection of images and select the relevant or irrelevant ones at each step. A more intuitive approach is to lay out the images on a manifold and allow users to navigate over it in a continuous manner. However, since the true dimensionality of the image space is high, creating a cohesive manifold that preserves the relations among all images is challenging, if indeed at all possible.

A self organizing map (SOM) is known from T. Kohonen. The self-organizing map, Proceedings of the IEEE, 78(9): 1464-1480, 1990, the contents of which are hereby incorporated by reference. The SOM is a popular dimensionality reduction method that produces a dense and intuitive grid-like structure. However, an SOM entails a computationally intensive training process, which is applied globally as a pre-process, making it difficult to use on a very large and dynamic dataset.

Image Browsing.

As large image collections become more and more widespread, it is increasingly important to allow users to easily search and browse these collections. Unlike text documents, the content of an image can be grasped at a glance, and a large number of images can be presented to a user at once. In image search, often the user does not have an exact target in mind (similar to the notion of informational types of tasks in Broder's taxonomy [3]). For example, if the user is looking for a "handshake" image to add to a presentation, the user does not necessarily know which image he or she is looking for. Thus, images presented in the first page of a text-based search result are not necessarily better than those presented in the following pages. Consequently, users have to sequentially scan these results spending considerable effort finding relevant images. Still, most current systems focus on providing text-based image querying rather than navigational support even though studies have shown that image browsing can improve a user's search needs [11].

The most common way to present a set of images is in a two-dimensional grid. In [13] it is shown that automatically arranging a set of thumbnail images in a grid according to their similarity was useful for users in an image browsing task. Similarly, in [11] the idea is to fit a collection of images on a grid view, based on similarity using an MDS-based algorithm. In PhotoMesa [2], images are laid in a large 2D grid. Users can use a zoomable user interface to browse through a large collection of images, panning to browse horizontally or vertically through the images and zooming out to see them semantically grouped into categories. However, the images in PhotoMesa are pre-categorized into directories and ordered according to meta-data (such as file name and date), regardless of visual similarity.

Relevance Feedback.

Many recent search and retrieval systems, including image retrieval, utilize relevance feedback [15], a method to refine search results using selection of preferred elements. [18] presented an image retrieval system that features iterative reference feedback. At each step, the user is presented with a small set of images, and selects a single image that is the closest match to the desired query. Then a new set of images is displayed and the process is repeated. After a small number of iterations, most of the displayed images match the given query. Works such as [1], [4], and [10] employed similar techniques for retrieval of 3D objects.

While this process may be effective at filtering relevant images out of a massive collection, the use of relevance feedback in commercial search interfaces is still relatively rare [16]. One possible explanation is that it requires users to make relevance judgements on each item, which is an effortful user task [16, 6]. Relevance feedback tends to work best when the user selects multiple objects as relevant as well as some objects as irrelevant. However, selecting multiple objects is cumbersome for most users. This is amplified in image search where extractable low-level features (e.g., color, texture, shape) may not necessarily match high-level perception-based human interpretation [21].

Dimensionality Reduction.

Dimensionality reduction is a wide area with applications such as clustering, segmentation, visualization, machine learning and more, and it has been extensively researched over the years. Common dimensionality reduction techniques such as multidimensional scaling (MDS) or locally linear embedding (LLE) [14] create a global manifold that aims to preserve the distances among the high dimensional data points, to the extent possible. Such global solutions are beneficial for applications such as clustering and classification, which rely on the underlying geometry or spread of data. A number of papers regarding mapping of images onto a plane such as [5, 20] follow that trend and focus on global shape, which easily shows relations among different types of images. Often, however, embedding high-dimensional data in a two-dimensional manifold is overly constrained and the embedded data does not reflect the original high-dimensional relations among the data points very well.

When browsing images, there is no need for an accurate representation of the original distances between images. In fact, an even spread of images over the map area can be more beneficial than an accurate representation of the original geometry, especially in cases where the original data includes very distinctive clusters which may appear too far apart for easy navigation. The above mentioned self-organizing map [7] produces a grid which preserves similarity between elements without preserving the distance. Works such as [17] and [9] utilize SOM to visualize a given small set of elements (up to a few hundred samples) in a global cohesive map. Such methods work very well for small sets, however they are too computationally intensive to be effective for massive datasets. In [8], an SOM was used to organize millions of documents. Due to the large volume of the dataset, special tools and methodologies had to be developed in order to allow processing the entire dataset, and several weeks of computation time were required.

Figure 3:
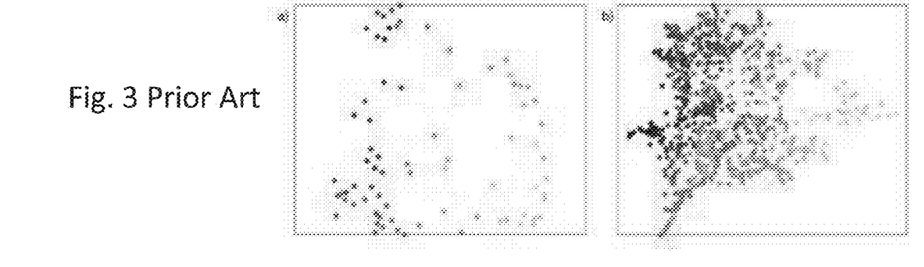
FIG. 3 is a simplified diagram showing a prior art system of arranging colored dots by nearest neighbor.

Spectral clustering and spectral embedding methods present a different approach, by constructing a nearest neighbors graph and ignoring long distances. The neighbors graph is then embedded using the eigenvectors of the graph's Laplacian, providing a global solution. Using only short distances provides a solution that preserves local distances, but is less constrained globally. The embedding created by spectral clustering for small datasets usually provides a locally continuous solution, in which a pair of data points are near in the embedding only if they are near in the original high-dimensional space, although note that the opposite is not always true. For large datasets, however, the low dimensional space cannot represent the complexity of relations between all samples. As a result, some elements are embedded near each other even though they are not related in the underlying graph. This is illustrated in FIG. 3 which shows typical spectral embedding of different numbers of colors. The image on the left, (a), shows a typical spectral embedding of 80 colors, randomly sampled from three dimensional RGB space. For this relatively low number of samples, the solution is locally continuous. In the right image, (b), 800 random colors were embedded using spectral embedding. The solution is no longer continuous as some colors, such as blue and orange, are far in color space yet embedded next to each other.

In summary, existing methods for image searching do not allow intuitive fluent browsing of the results. Results are ordered arbitrarily or by keyword relevance, with no regard to visual or contextual relations between near images. Relevance feedback methods let the user select relevant images in each step, however the browsing experience is not continuous and new images appear in each iteration.

The following documents are believed to be representative of the art in the field and the contents thereof are hereby incorporated herein by reference:

[1] Ceyhun Burak Akgul, Bulent Sankur, Yucel Yemez, and Francis Schmitt. Similarity learning for 3d object retrieval using relevance feedback and risk minimization. Int. J. Comput. Vision, 89:392-407, September 2010.

[2] B. B. Bederson. Photomesa: a zoomable image browser using quantum treemaps and bubblemaps. In Proceedings of the 14th annual ACM symposium on User interface software and technology, pages 71-80. ACM, 2001.

[3] A. Broder. A taxonomy of web search. In ACM Sigir forum, volume 36, pages 3-10. ACM, 2002.

[4] Liangliang Cao, Jianzhuang Liu, and Xiaoou Tang. 3d object retrieval using 2d line drawing and graph based relevance reedback. In Proceedings of the 14th annual ACM international conference on Multimedia, MULTIMEDIA '06, pages 105-108, New York, N.Y., USA, 2006. ACM.

[5] Chaomei Chen, George Gagaudakis, and Paul Rosin. Similarity-based image browsing, 2000.

[6] W. B. Croft, S. Cronen-Townsend, and V. Lavrenko. Relevance feedback and personalization: A language modeling perspective. In DELOS Workshop: Personalisation and Recommender Systems in Digital Libraries, 2001.

[7] T. Kohonen. The self-organizing map. Proceedings of the IEEE, 78(9):1464-1480, 1990.

[8] T. Kohonen, S. Kaski, K. Lagus, J. Salojarvi, J. Honkela, V. Paatero, and A. Saarela. Self organization of a massive document collection. Neural Networks, IEEE Transactions on, 11(3):574-585, 2000.

[9] A. Lasram, S. Lefebvre, and C. Damez. Procedural texture preview. In Computer Graphics Forum, volume 31, pages 413-420. Wiley Online Library, 2012.

[10] George Leifman, Ron Meir, and Ayellet Tal. Semantic-oriented 3d shape retrieval using relevance feedback. The Visual Computer, 21(8-10):865-875, 2005.

[11] H. Liu, X. Xie, X. Tang, Z. W. Li, and W. Y. Ma. Effective browsing of web image search results. In Proceedings of the 6th ACM SIGMM international workshop on Multimedia information retrieval, pages 84-90. ACM, 2004.

[12] A. Oliva and A. Torralba. Modeling the shape of the scene: A holistic representation of the spatial envelope. International Journal of Computer Vision, 42(3):145-175, 2001.

[13] K. Rodden, W. Basalaj, D. Sinclair, and K. Wood. Does organisation by similarity assist image browsing? In Proceedings of the SIGCHI conference on Human factors in computing systems, pages 190-197. ACM, 2001.

[14] S. T. Roweis and L. K. Saul. Nonlinear dimensionality reduction by locally linear embedding. Science, 290 (5500):2323-2326, 2000.

[15] Y. Rui, T. S. Huang, M. Ortega, and S. Mehrotra. Relevance feedback: A power tool for interactive content-based image retrieval. Circuits and Systems for Video Technology, IEEE Transactions on, 8(5):644-655, 1998.

[16] I. Ruthven and M. Lalmas. A survey on the use of relevance feedback for information access systems. The Knowledge Engineering Review, 18(02):95-145, 2003.

[17] Yasuhiko Sakamoto, Shigeru Kuriyama, and Toyohisa Kaneko. Motion map: image-based retrieval and segmentation of motion data. In Proceedings of the 2004 ACM SIGGRAPH/Eurographics symposium on Computer animation, SCA '04, pages 259-266, Aire-la-Ville, Switzerland, Switzerland, 2004. Eurographics Association.

[18] Nicolae Suditu and Francois Fleuret. Heat: Iterative relevance feedback with one million images. In International Conference on Computer Vision, October 2011.

[19] J. Surowiecki. The wisdom of crowds: Why the many are smarter than the few and how collective wisdom shapes business. Economies, Societies and Nations, 2004.

[20] Kilian Q. Weinberger and Lawrence K. Saul. Unsupervised learning of image manifolds by semidefinite programming. Int. J. Comput. Vision, 70:77-90, October 2006.

[21] X. S. Zhou and T. S. Huang. Relevance feedback in image retrieval: A comprehensive review. Multimedia systems, 8(6):536-544, 2003.

SUMMARY OF THE INVENTION

The present invention provides a method and apparatus for exploring and browsing images on a dynamic map, and provides an implementation that can be used to generate such dynamic maps.

Inspired by spectral clustering and spectral embedding, the present embodiments use a similar nearest neighbors approach, while completely removing the global constraints. Computing a global map, as per the prior art, is not necessary for the purpose of searching and exploring a massive dataset, as these interactions rely more on local connections than the global shape of the map. The present method also allows rapid changes in the dataset such as removing elements and adding new elements, without the heavy computation necessary by SOM or other global dimensionality reduction methods.

As discussed, previous methods for laying out images on a plane are focused on global shape and require heavy computation. The present method is local, and enables the user to control the local layout of the map in every navigation step. The computation is fast and can be done on-the-fly during user interaction. In contrast with previous methods, the present method is extremely scalable and supports massive datasets with a short computation time that does not depend on the size of the dataset.

The present embodiments provide a method for laying out images on a dynamic map with pan and zoom capabilities, in which elements are ordered such that similar images appear next to each other. The dynamic map is local and user-specific, driven by the user's navigation tendencies and interests. As such, it does not entail the upfront creation of a full global map. Dynamic map generation is fast and scalable, independent of the number of images in the dataset, and it seamlessly supports online updates to the dataset. The present embodiments may provide a viable solution for massive and constantly varying datasets consisting of millions of images, such as Internet image hosting services.

In addition, the present embodiments may use dynamic maps to generate a user-defined associative similarity graph in which edges correspond to images that users find most similar. This enables identifying similarities between images of the same person, same location, same event or other contextual relations which cannot be detected using feature based methods. The associative similarity graph can then be used to define a global associative distance metric between every two images in the dataset, which can be used for clustering, classification and many other applications.

An advantage of the present embodiments is that they may provide immediate and continuous interactive feedback that does not require the user to make selections based on sequential search, but rather asks the user to visually choose a direction to follow based on general perceptive cues.

The present inventors are not aware of any previous work in which a user-defined associative similarity is used or generated. Associative similarity can show contextual connections which are hard to find without prior knowledge, such as photos of the same place from different viewing points or paintings of the same artist.

According to a first aspect of the present invention there is provided a method of mapping a collection of items of high dimensional data, the high dimensional data being any of images or text documents or three dimensional objects or higher than three dimensional objects, onto a navigable grid for browsing, the browsing being via a user interface: the method comprising:

obtaining for respective items of the collection a list of nearest neighbor items and scores indicating degrees of similarity between the respective item and each of the listed nearest neighbors;

placing a first of the items on a cell within a grid;

from a respective list of nearest neighbor items of the first item, finding items that maximize a compatibility score with items already placed on the grid, the maximizing using respective similarity scores; and placing respectively found items on neighboring cells on the grid; and continuing to place further items on the grid, by the maximizing of respective compatibility scores, until all cells visible to a user are filled with items.

The method may comprise allowing a user to move the grid to expose further cells, and filling the newly exposed cells with further items maximizing the compatibility score.

In an embodiment, the moving comprises panning, to expose cells adjacent to current cells.

In an embodiment, the moving comprises zooming in, to expose cells in between current cells, or zooming out, to hide some of the current cells.

In an embodiment, the compatibility score comprises a weighted sum of similarity scores for each neighbor that appears in the respective list of nearest neighbor items.

In an embodiment, the similarity scores are computed from one or more of: average color over predefined item segments, a joint color histogram, and a spatial envelope. As will be discussed below, if more than one measure is used then the separate measures are normalized and used together.

The method may comprise placing additional items at predefined locations on the grid to constrain the grid.

The method may comprise allowing a user to place additional items at selected locations on the grid, and constraining the grid thereby.

The method may provide for interactive browsing of items on a screen comprising using the navigable grid as discussed.

According to a second aspect of the present embodiments there is provided a method of interactively browsing items on a screen, the items being from a collection of high dimensional items including text documents, images, and three- and -higher dimensional objects, and being dynamically mapped to a grid during the browsing, the method comprising:

in advance of browsing:

obtaining for respective items of the collection a list of nearest neighbor items and scores indicating degrees of similarity between the respective item and each of the listed nearest neighbors;

placing a first of the items on a cell within a grid;

during the browsing providing a subset of cells of the grid on an interactive user screen and for each of the cells placed on the screen and not having items assigned thereto:

from a respective list of nearest neighbor items of the first item, finding items that maximize a compatibility score with items already placed on the grid, the maximizing using respective similarity scores; and placing respectively found items on neighboring cells on the grid; and continuing to place further items on the grid, by the maximizing of respective compatibility scores, until all cells visible to a user are filled with items.

According to a third aspect of the present invention there is provided a user interface for browsing items according to similarity comprising:

an arrangement of positions, each position having a first number of nearest neighbors, a subset of the positions being visible to a user on a screen, the arrangement being navigable via user interaction to reach new positions not currently visible on the screen;

an item placer for placing a seed item in one of the positions and for subsequently placing further items being located in neighboring positions of the visible subset, the further items being selected to minimize a distance metric with currently placed neighboring items, the item placer continuing to place additional items on new positions as the new positions are revealed by the user interaction, the further items also being selected to minimize the distance metric with already placed neighboring items.

In an embodiment, the item placer is configured to be provided with items and corresponding k nearest neighbor lists for placing in the positions.

As discussed, the items may be images.

The embodiment may allow users to reposition items on the positions, the user repositioning being allowed to override the similarity scores, thereby to provide crowdsourcing based enhancement for the images.

The embodiment may comprise a random jump input for causing the currently visible subset to jump to a new randomly chosen seed image.

The interface may carry out zooming by designating high level items for display in a low zoom, then zooming out by revealing further positions in between already filled positions and inserting items in between the high level items in the newly revealed positions in accordance with the minimizing of the distance metric.

The item placer may use results from a keyword search to carry out the placing of the seed item. Additionally or alternatively, the item placer may use results from a keyword search to filter items placed in the positions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to the formation and use of dynamic maps for exploring and browsing images and, more particularly, but not exclusively, to a way of carrying out local exploring and browsing of a large image data set.

The present embodiments may provide a dynamic map of images with pan capabilities and a user interface that resembles an online experience of navigating through geographical maps. The images on the map are placed next to their nearest neighbors in a high-dimensional feature space, and the dynamic maps can be thought of as a local pseudo-manifold representation within that space, generated on the fly, during user interaction. The locality of the solution enables a user-specific layout which reflects the user's navigation tendencies and interests. This intuitive solution for image browsing provides a continuous relevance feedback, with a substantially shorter feedback loop than state of the art relevance feedback methods in which the user selects specific images at each iteration. In contrast to common multidimensional embedding methods, the present solutions may not entail the upfront creation of a full global map. Dynamic map generation is fast and scalable, independent of the number of images in the dataset, and it seamlessly supports online updates to the dataset. The present embodiments provide a technique which may be a viable solution for massive and constantly varying datasets consisting of millions of images, such as Internet image hosting services. An example given hereinbelow demonstrates and evaluates the robustness and scalability of the present approach with a user evaluated system that features a dynamic map of one million images.

The premise of the work presented here is an intuitive navigation in the image space, that can support a massive, dynamic dataset of images. An idea is that for image-based navigation, in which the user is seamlessly browsing through the image space, the global requirements can be relaxed. Navigation is done over a pseudo-map, where the data is dynamically organized into a local manifold only in the region currently observed by the user. The challenge in generating such pseudo-maps is to create local manifolds that keep the sense of continuity. That is, the user pans over the pseudo-map while the manifold is perceived to be continuous.

In the present embodiments, we present a technique of embedding images onto dynamic pseudo-manifolds. The pseudo-manifolds are dynamic in the sense that they are generated during navigation and in response to the user actions, such that the relative positions of images respect only local high-dimensional relations. Distances between the displayed images are not necessarily preserved, allowing for an efficient usage of the display space and a spatially dense representation of the images. The optimization problem becomes one of maximizing the similarity of nearby images, such that each image is surrounded by similar images. The result is a continuous map in which images show a gradual change over local neighborhoods.

The present embodiments show that navigation over the pseudo-maps enables an open-loop exploration, where users may quickly and seamlessly direct the search towards relevant images of their choice, without the need to sequentially go over the images and select the relevant ones. While this work focuses on browsing images, the method can be tailored to other types of high dimensional data such as video segments, 3D meshes, and even text documents.

The dynamic map of the present embodiments bears some resemblance to the self organizing map (SOM) [7], a popular dimensionality reduction method that produces a dense and intuitive grid-like structure. However, an SOM entails a computationally intensive training process, which is applied globally as a pre-process, making it difficult to use on a very large and dynamic dataset. The present technique, by contrast, is dynamic and computationally inexpensive, allowing the addition and removal of data during execution, and the map is readily updated accordingly.

The generation of local neighborhoods in the dynamic map is based on the assumption that for high dimensional data such as images, short distances are more accurately measured than long distances. Even for a human observer, the task of deciding which images are more similar to each other is easier for a set of similar images than for a set of very different images. This carries over to automatically computed distance measures as well. We thus use only the shortest distances between images in our dataset. Only the distances to k nearest neighbors (with k being a small positive integer) of each image in the dataset are considered. Images farther apart relate to each other by a sequence of nearest neighbors that connect them, utilizing short distances in the whole set. A dense set is expected to have shorter distances than a sparse set, hence the present method is especially suitable for massive datasets.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways. In particular the present embodiments describe a particularly efficient way of generating the dynamic maps, however other methods of generating dynamic maps will be apparent to the skilled person after considering the present disclosure.

Figure 1A:
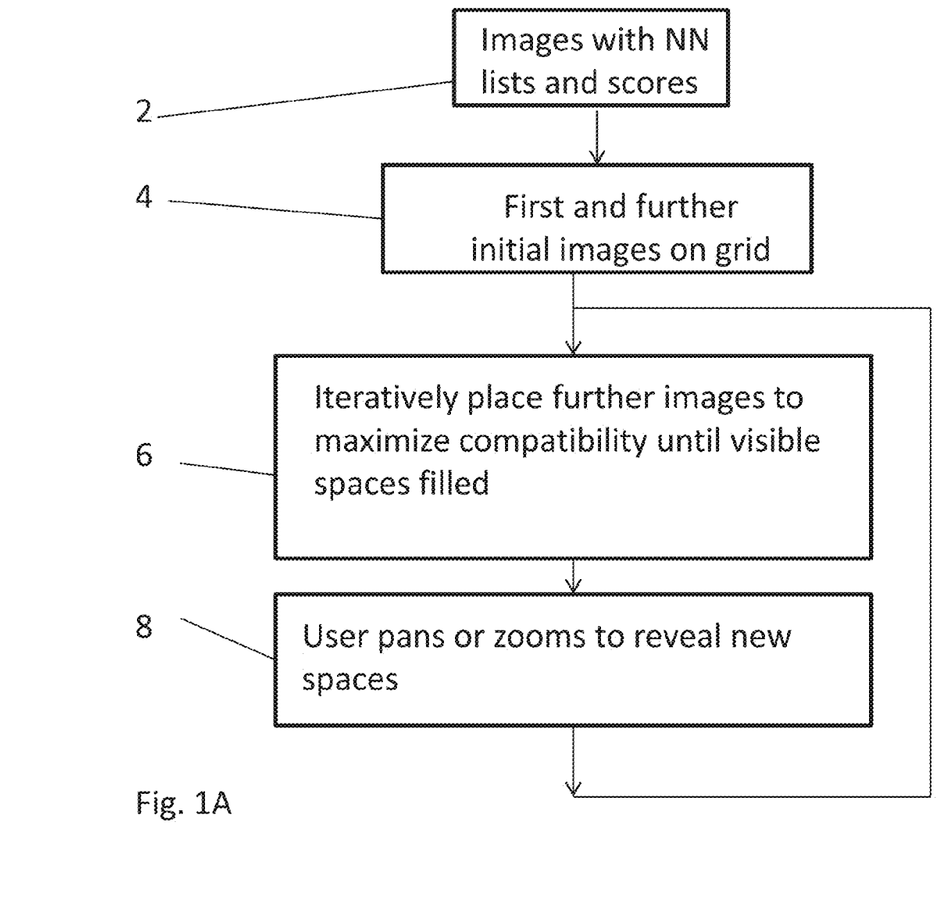
FIG. 1A is a simplified flow chart illustrating a method of providing images from a database for browsing according to an embodiment of the present invention.

Referring now to the drawings, FIG. 1A is a flow chart illustrating a generalized embodiment of the present invention. The flow chart shows a method of mapping a collection of images onto a navigable grid for browsing via a user interface. The method obtains 2 as input a database of images, each image having a list of its nearest neighbors, and distance scores to each of those nearest neighbors. A first image is placed 4 on a grid. Additional images may optionally be placed at other locations on the grid to seed and constrain later placement of images as will be discussed below.

Then for the remaining grid cells currently visible to the user, a process 6 of maximizing compatibility is used to find which of the images on the list of nearest neighbors is most compatible with all the images that have already been placed on the grid. The image found to be most compatible is placed until the visible part of the grid is full. Then the user may pan the grid or zoom 8 the grid, to reveal more cells, and the same process is used to place further images on the grid. The process continues as long as the user continues to browse.

Figure 1B:
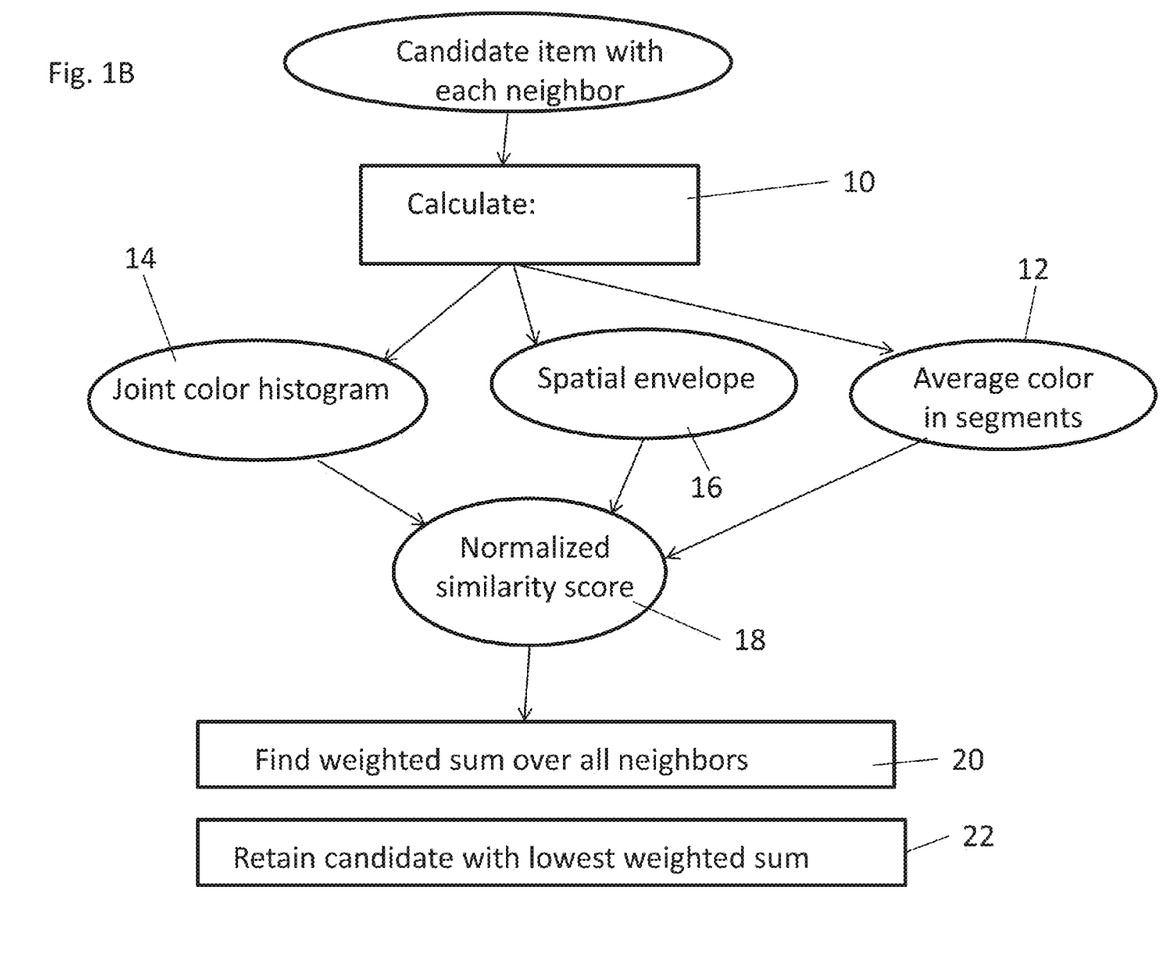
FIG. 1B is a simplified flow chart illustrating the use of a multiple factor distance metric to indicate the distances of items to their neighbors according to an embodiment of the present invention.

Reference is now made to FIG. 1B, which is a simplified diagram showing how a distance is calculated from one image to the different neighbors. With each neighbor the compatibility score may comprise a weighted sum of similarity scores for each neighbor that appears in the respective list of nearest neighbor images. The similarity scores may be computed—box 10—from any similarity measure or a combination of similarity measures, including, but not limited to, one or more of: average color over predefined image segments—box 12, a joint color histogram—box 14, a spatial envelope—box 16, and a normalized similarity score—box 18—being a combination of the previous similarity scores, as will be discussed in greater detail below. Box 20 indicates finding a weighted sum of the normalized similarity scores with all the neighboring images. A best item for the given position is the item that minimizes the weighted sum—box 22.

In an embodiment the user may be allowed to place additional images at selected locations on the grid so as to constrain further image placement. Such a feature allows crowd sourcing to manage large or ever-growing databases.

Figure 2A:
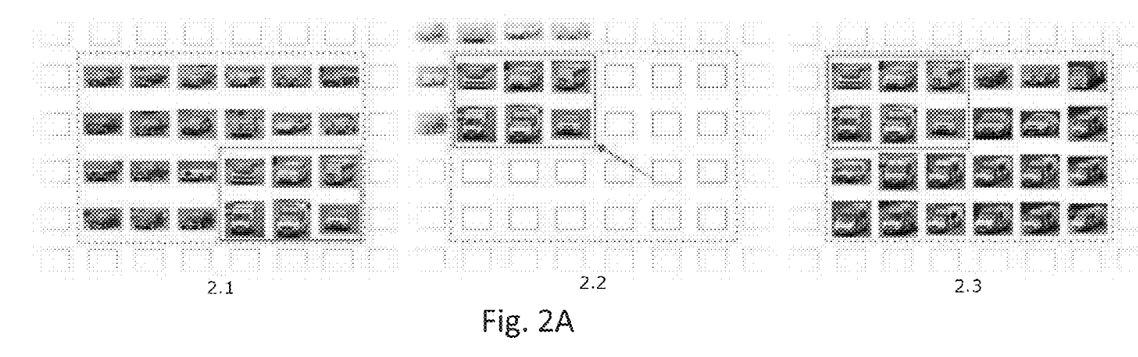
FIG. 2A is a simplified diagram illustrating panning through the image grid of FIG. 1.
Figure 2B:
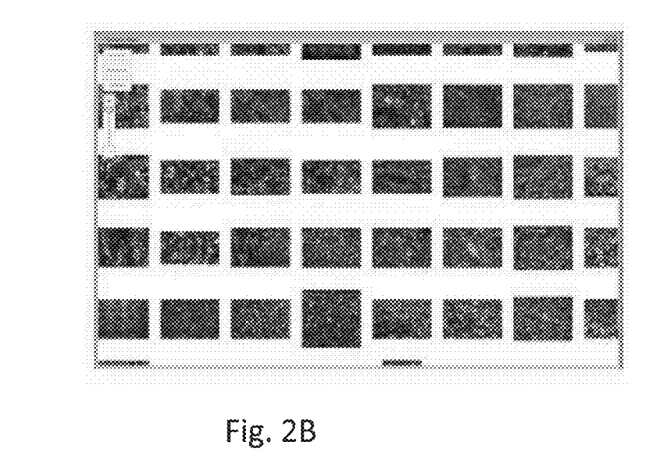
FIG. 2B is a simplified diagram showing a series of similar images placed as neighbors in the grid of FIG. 1.

FIG. 2A illustrates a panning process within an image dataset according to a preferred embodiment of the present invention. The user views a local subset (2.1) of images, ordered such that similar images are next to each other. The user decides to pan towards images on the bottom right corner, shown within a rectangle in (2.1) and also shown as the top left hand corner in (2.2). New images similar to the ones depicted by the rectangle appear outside the previous boundaries of the map in (2.3) to reveal another patch of the map. The currently displayed map can be figuratively viewed as a window that shows a local patch of the pseudo-manifold. FIG. 2B shows a screenshot of a local patch of the map during a typical browsing session.

Map Generation

The present embodiments provide the user with a dynamic grid-like map which is instantly and continuously generated during user interaction. The input to the map generation process is a precomputed list of nearest neighbors and their similarity score. The map can be seeded around a specific image or constrained by any number of images. As the user navigates by panning the map, the map is extended locally to the region of interest, using previously placed images as constraints. The map is generated by iteratively filling in empty cells in the grid with the most compatible image for each cell. The compatibility of an image to a cell in the grid depends on the images that are already assigned to adjacent cells in the grid.

Referring again to FIG. 1B, every image I in the dataset is associated with a list of nearest neighbors $\{N1(I), \ldots, Nk(I)\}$ and their respective similarity scores $\{S1(I), \ldots, Sk(I)\}$. Each cell c in the grid is connected to a weighted list of adjacent cells c1, ..., cj with respective weights Wj. For example, in our implementation each cell is connected to eight adjacent cells with weights that correspond to the euclidean distance between the cells. That is, for cells to the left, right, top, and bottom of cell c the weights are one and for cells that are diagonally connected to c the weights are $$C(I, c) = \sum_{i,j: N_i(I) = R(c_j)} W_j \cdot S_i(I).$$

We refer to existing images that occupy the adjacent cells of cell c as reference images or R(c). The compatibility score of an image I relative to a cell c is defined as the weighted sum of similarity scores for each neighbor that appears in the list of reference images:

$$\frac{1}{\sqrt{2}}..$$

At each iteration, we choose a vacant cell c in the grid, and search for the image that maximizes the compatibility score, $$I_c = \underset{I}{\operatorname{argmax}} C(I, c)$$

To reduce the search space, we only consider images which are nearest neighbors of the reference images. We also exclude images that already appear on the map from the candidates list, to avoid repetitions. Since the number of adjacent cells is at most eight, the number of candidates for each grid cell is no more than 8 k. However, in most cases a cell will not have more than four existing images when it is assigned, so in practice the number of candidates is usually less than 4 k. Thus, the computational cost of creating the map amounts to a small constant, independent of the dataset size, which allows creating the map on-the-fly during user interaction at a rapid fashion.

Figure 4:
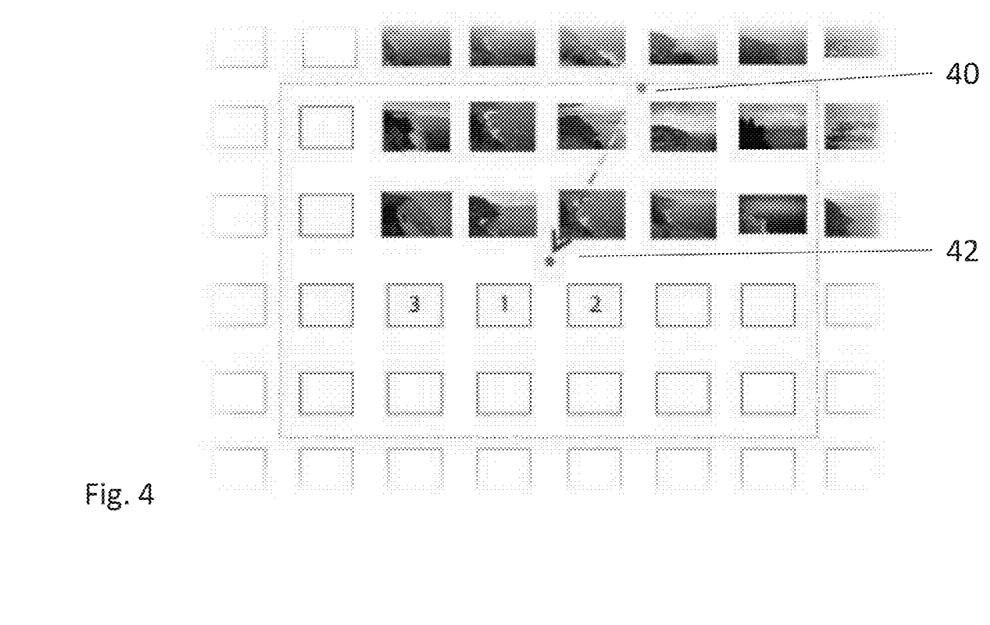
FIG. 4 is a simplified diagram illustrating panning in a given direction of the grid of FIG. 1.

Since the map generation process is greedy, the order in which empty cells are selected has a great effect on the mapping. To provide the user with a better control over the kind of images that will appear on the map, we select the vacant cells in accordance with the user actions; in general, we give precedence to cells that have as many reference images as possible. However, since the map is a regular grid, often there will be ties and many cells will have the same number of reference images, for example along the edge of the previous region of interest. We break ties by selecting the cell which is closest to the direction the user panned to. This causes the grid to start growing from the user's focus area on and outwards into the rest of the map. FIG. 4 illustrates the order in which empty cells in the grid are filled. The user drags the map two images up and one image to the right. The center of the user's viewport thus moves on the map in the opposite direction; two cells down and one cell to the left. The cells marked as numbers 1, 2 and 3 are closest to the direction of movement and therefore will be filled in order, followed by the rest of the cells on the grid. Existing images which are closer to the panning direction effectively have more weight in the map generation, since their neighbors are selected first.

In greater detail, FIG. 4 shows that the order in which cells in the map are filled is relative to the direction of browsing. In this example, the user has dragged the map two images up and one image to the right. The point 40 and point 42, respectively, mark the previous and new center of the viewport. The numbers 1, 2, and 3 within the cells state the order in which the first three images on the map are filled.

The map-filling algorithm is relatively simple and easy to adjust to custom graphs. The algorithm may be applied to graphs of any shape, and does not require regularity or planarity. It is also possible to change the connectivity of the graph to have a larger support for each cell, so each image affects the neighbors of its neighbors. Supporting weighted graphs requires a minute change in the compatibility score.

Zoom Levels

The present dynamic maps support zooming out to see a larger variety of images, and zooming in on a region to see more similar images. The embodiments support zooming operations by selecting high-level delegates for every image in the dataset. The embodiments may require that every image has at least one delegate in its nearest neighbors list. This is in essence a problem of finding a vertex cover of the k-nn graph. Finding an optimal vertex cover is an NP-hard problem, however the embodiments do not require optimality and hence can use a straightforward algorithm, which can be done once for the whole dataset or incrementally when new images are added.

Figure 5:
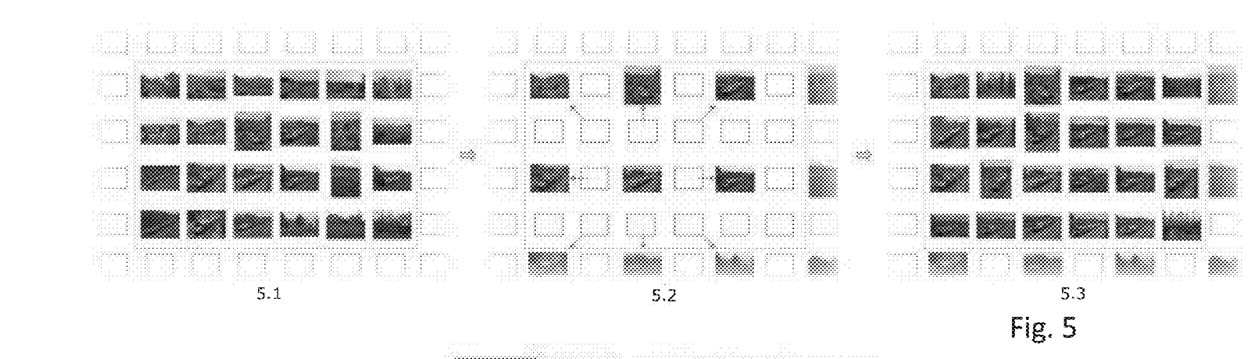
FIG. 5 is a simplified diagram illustrating zooming of the grid of FIG. 1.

Reference is now made to FIG. 5, which illustrates zooming in. FIG. 5.1 shows an initial map. FIG. 5.2 shows the same map after a zoom in operation, with empty spaces between the images. FIG. 5.3 shows how the map is filled with new images that match their surroundings.

For each image in the dataset, we check whether one of its nearest neighbors is already a high-level delegate. If none of the nearest neighbors of the image is a delegate, the image itself becomes a delegate for all of its neighbors. The same process can be done when adding a new image to an existing dataset.

Then, a list of high-level nearest neighbors is created for each high-level delegate $I_A$. A high-level neighbor is a delegate $I_B$ that has at least one common nearest neighbor with $I_A$. The score of the high-level neighbors is the minimum accumulated score of the path in the k-nn graph that connects the two delegates:

$$S(I_A, I_B) = \min_{N_i(I_A) = N_j(I_B)} (S_i(I_A) + S_j(I_B))$$

If a delegate has more than k high-level neighbors, only the first k neighbors are kept. This process can be repeated recursively on the high-level k-nn graph to create multiple zoom levels. The list of high-level delegates and their k-nn graph is computed as part of the pre-processing, so there is no additional computational cost for browsing when there are multiple zoom levels.

If there are $l_{max}$ zoom levels and the user is browsing the map in zoom level $1 \leq l_i \leq l_{max}$, only images of level $l > l_i$ are displayed, and the knn graph of level $l_i$ is used. When the user zooms in to level $l_i - 1$, the images are spaced out by a given amount, as illustrated in FIG. 5. In the present implementation the map size doubles, so there is one vacant cell between every two images in every direction. Then the map generation process fills the gaps using the k-nn graph of level $l_i - 1$. Note that higher level delegates are not excluded from the map when browsing lower levels, and can appear among low level images according to the low level k-nn graph.

When the user zooms out to level $l_t+1$, a continuous browsing experience is maintained by keeping some of the images that were displayed. As with zooming in, spacing may vary. In the present implementation the map size is reduced by half in every direction, so there is one image left out of every four. Since the map is now smaller then the region of interest, images are filled around it using the map generation process and the k-nn graph of level $l_t+1$. Since some of the images are potentially from a lower level, they may be missing from the k-nn graph, in which case they use the k-nn lists of their closest delegates.

Nearest Neighbors of Images

The map generation is decoupled from the k nearest neighbors computation, which could be replaced by any k-nn dataset. In our implementation we find the k nearest neighbors of every image using several image metrics, or image descriptors. Each of the following descriptors is computed for each image in the dataset. The distance between two images in each descriptor space is the Euclidean distance between the image descriptors.

Average Color.

The image is divided into 16 segments, a four by four grid, and the average color in each segment is computed. Similar images in this metric tend to have a similar composition. Of course, the size of a single segment does not necessarily have to be four by four, but we find this partitioning appealing in the sense that it seems fine enough to distinguish between images with significantly different compositions, yet sufficiently coarse to ignore small changes in composition of similar images.

Color Histogram

A joint color histogram for RGB values is computed. Each color channel is divided into four bins, to create a total of 64 bins for every color combination. The number of pixels that fall in each bin is counted and divided by the total number of pixels in the image. Similar images in this metric have similar color distributions, which suggest a similar atmosphere or surrounding. This descriptor is less sensitive to translation, rotation or reflection of the images compared with the average color descriptor.

Spatial Envelope.

The spatial envelope was described by Oliva and Torralba in [12] and named gist descriptor since it captures the gist or context of a scene. The gist descriptor describes the spatial structure of a scene using a set of spectral signatures which are specifically tailored for the task of scene recognition. It was shown that in the gist descriptor space, scenes that belong to the same context are projected close to each other. We use the code provided by the authors to compute the gist descriptor of every image in the dataset.

The three descriptors are calculated for each image, and k nearest neighbors are found for each descriptor space separately. The distance from the image to each nearest neighbor in each descriptor space is kept as well. The three lists are then merged to a single list of k nearest neighbors by computing a normalized score for each candidate which appears in one or more lists.

Normalized Similarity Score.

For each image I and descriptor space d we have a list of neighbors $NI,d(i)$ with corresponding distances $DI,d(i)$. To normalize distances $DI,d(i)$ we first compute the z-score (or standard score) $z=(d-\mu d)/\sigma d$, where $\mu d$ and $\sigma d$ are the estimated mean and standard deviation of distances between any two images in descriptor space d. To estimate $\mu d$ and $\sigma d$ we take 100 groups of random samples, calculate the mean and standard deviation of distances between all images in the group and choose the median values between all groups.

A low z-score value means the distance between images is below the average distance between any two images by a certain amount of standard deviations, and so it allows us to compare distances in different descriptor spaces to obtain a unified similarity rank.

The z-score value is unbounded, so we use a sigmoid function $1/(1+e^{-x})$ to transform the values to the range $[0, 1]$. The normalized similarity score for each neighbor $NI,d(i)$ is then given by $$S_{I,d}(i) = 1 - \text{sigmoid}\left(\frac{D_{I,d}(i) - \mu_d}{\sigma_d}\right)$$

$SI,d(i)$ is a value in the range $[0, 1]$, where low values mean high distance and low similarity and high values mean low distance and high similarity. We then sum the normalized scores of all lists for every neighbor, and choose the candidates with the highest k scores as the unified nearest neighbors of the image.

Figure 6:
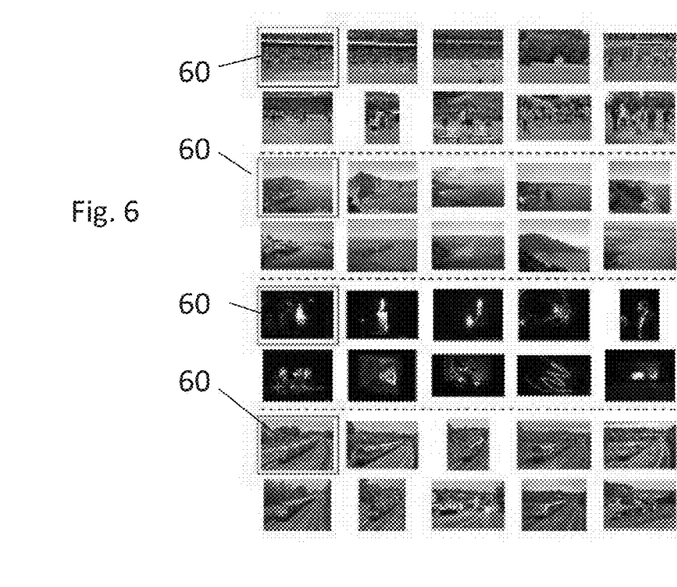
FIG. 6 is a simplified diagram illustrating four different seed images and a series of resulting image-filled neighboring cells as obtained by using the method of FIG. 1.

Reference is now made to FIG. 6 which shows a few examples of images and their nearest neighbors. Images 60 marked with rectangles serves as seeds and fill neighboring cells with similar images.

Note that the presently described normalization method can support many different descriptors with different distance metrics, so additional image descriptors can be plugged into the system seamlessly. Moreover, since the present pre-processing and map generation are decoupled, we can use any nearest neighbors dataset, including datasets originating from non-metric similarity measures.

Dataset and Implementation Details

In order to demonstrate the soundness and scalability of the solution, a user evaluated system is presented which contains a dataset of one million images. The images were downloaded from the Flickr image hosting service from a collection of free to use (creative commons with attribution license) images. The image collection spans photos with an upload date within a range of 400 days, where for each day in the range a few thousands of random images were selected. This has resulted in a diverse dataset which contains images of many different types, such as landscapes, urban areas, people, wildlife, birds, vehicles and more.

The present implementation is divided into two separate systems. Computing image descriptors and finding the k nearest neighbors of each image was done as a pre-process in Matlab, and the user interface and map generation algorithm were implemented using C#.

Computing k nearest neighbors for a massive dataset requires some special considerations. Due to space considerations, we divide the images into 10 segments of 100,000 images each. The k nearest neighbors are computed separately for each pair of segments, a source segment and a target segment, where neighbors from the target segment are found for each image in the source segment. There are a total of 100 pairs of segments for which this computation is done. The lists are then merged for each source segment to create a list of k nearest neighbors from the whole dataset.

For each pair of segments, we employ a simple locality sensitive hashing scheme (LSH) which is based on the high dimensionality of the image descriptor. For the LSH we consider images from the two segments (source and target) as one group. The group of images is recursively partitioned at each iteration into two subgroups which contain a roughly equal number of images. At each recursive iteration, the group is partitioned according to the descriptor value in a single random dimension. The median descriptor value for that dimension in the current group is found, and images for which the value is higher are separated from images for which the value is lower than the median. We use six levels of recursion to create 64 groups of about 1500 images, for which the k nearest neighbors are found using an extensive search. The LSH ensures that most of the images that are similar to each other will be in the same group. However, similar images that have a descriptor value which is close to the local median might be separated into two subgroups. In order to decrease the chance of similar images falling into separate groups, we repeat the LSH and k nearest neighbors search five times, each with a different random selection of dimensions, and merge the resulting lists into a single list.

Using LSH, the computation of the k nearest neighbors of a segment was successfully reduced from a couple of hours into a few minutes, which in turn reduced the total computational time for the whole dataset (which is multiplied by 100) from several days to a few hours.

User Interface.

The user interface enables the user to navigate the image space by dragging the mouse cursor over the images. The image grid pans according to the drag command in a similar way to that which is done in maps. As soon as the user releases the mouse button when dragging, the map is populated with new images. For zooming, embodiments provide an interface similar to online mapping services, e.g. Google Maps, in which the user sees the current zoom level and can click to zoom-in or zoom-out of the current map. The map can be initialized from a random location or from a manually set location, at the user's discretion.

New images are loaded in less than a second after every navigation action. Internal profiling of the system shows that the map generation algorithm takes between 0.001 and 0.02 seconds for each page, depending on the number of new images that are fetched. The bottleneck of the present system is loading the image files from disk which takes a little less than a second. This shows that the algorithm is suitable for handling large datasets with ease.

Evaluation

We have conducted an initial evaluation study to examine the use and utility of the presently described embodiments. The purpose of the evaluation was to examine how users react to similarity-based navigation and to assess the strengths and weaknesses of the present method. We therefore performed a qualitative study rather than a comparative one.

We recruited eight participants, of whom all but one were students from a local university. The average age was 32.8, with standard deviation of 9.5. All participants had previous experience with searching images on the Web, mostly using Google Images. Participants were seated in front of a 22" screen with 1600×900 pixel resolution. This allowed for a grid of about 9×5 images to be displayed. The system and user interface features were first explained to the participants, who were then allowed to freely browse around the image space until they felt comfortable with the interface. Participants were told that they were to choose images for a collage made for a personal album. They were instructed to find the best and most interesting images for the collage, and were given seven different tasks. Tasks for choosing images varied from search-oriented tasks (e.g., "find two images of animals for your collage", "find two scenery images") to more browse-oriented tasks (e.g., "find two images with a small object on a clear background", "find two images that have different shades of green"). The entire session took around 40 minutes. Participants were observed during the session and interviewed at the end of the session. They were asked about their opinion of the system, its advantages and disadvantages, its utility regarding the different tasks, and whether they would like to see such a system embedded in their search engine. In general, most of the participants liked the ability to browse through similar images, and liked the interaction afforded by the system, for example to drag the mouse to browse toward a particular direction. The interaction paradigm was very intuitive, and all participants quickly learned how to use the system in order to browse towards a certain direction (e.g., browse toward more greenish images). All participants said that they thought this would be a good addition to keyword search, and as such, would like to use it in the future.

As expected, it was more difficult for participants to find adequate images in the search-oriented tasks than in the browse-oriented tasks. Often, in the search-oriented tasks, participants found one relevant image (e.g., an image of a cat), but browsing did not help them get to more cat images; rather, they frequently drifted towards other types of images, according to color or other features. For the browsingoriented tasks, on the other hand, participants were able to slowly reach a local area that addressed the task (e.g., found images of birds or airplanes in the middle of the sky), which allowed them to browse through multiple relevant images. This was acknowledged by the participants with one of them stating: "After I managed to get close to the right area, I got many good images to choose from. This would be difficult to get with Google Images". This was also reflected by participants' response to the utility of the different tasks, with most participants stating that the system was better for the browse-oriented tasks than for the search-oriented tasks.

Responding to questions about the disadvantages of the system, most participants said they found it hard to find a good starting point for the browsing. That is, it was often difficult to get to the area where they could refine the search. Two main strategies were used for finding a starting point. One was to zoom out, center on an area that seemed close to the target and then zoom in, and the other was to press the 'random' button multiple times; we supplied a 'random' button to the interface that allowed for jumping to a random location upon pressing it. They did so until reaching a plausible looking place to start browsing from. Because we envision our method as local area browsing whose purpose is to augment rather than replace keyword search, we do not see this as a major problem.

Finally, some participants added that the advantage of the method is in its ability to find images according to structures, shapes or general 'feeling' of the image, which is often rather difficult in regular search engines. As one participant said: "For designers, this can be very useful. If, for example, you are looking for a certain structure, impression or dynamic in an image and not necessarily a certain object, this can be very useful."

Associative Similarity Measure

Dynamic maps can be used to generate a user-defined similarity measure, or associative similarity measure. The associative similarity defines a k-nn graph in which neighbors are related by association, which is sometimes hard to measure numerically. Similarity in color or shape can be measured and computed, however associative similarity may also be similarity in context, such as images of the same person, same location, same event and other contextual relations. We calculate associative similarity in the following manner. A dataset of images with nearest neighbors is initialized according to computed similarity measures, based on various image descriptors. Users are then requested to place images in the most suitable location on the map according to their similarity to neighboring images. They can also decide to move images from their currently displayed location to a location which better reflects their nearest neighbors. Positioning an image or moving it to a new location provides an associative similarity score between the given image and several existing images in the selected region. The associative similarity scores have precedence over the computed similarity measures and gradually replace them in the k-nn graph.

Since associative similarity is subjective, we aggregate decisions from many different users to generate the associative k-nn graph. Crowdsourcing of this process can quickly generate a nearest neighbor graph for large datasets, which reflects the most prominent relations observed by many users, utilizing the wisdom of the crowd [19]. To aggregate results from many users, the similarity score is accumulated for every associative relation between images. Placing an image on the dynamic map is equivalent to selecting a list of nearest neighbors on the map with similarity scores of their relations to the given image. The similarity score of each relation is then accumulated with previous similarity scores of the same relation. The associative k-nn graph structure maintains all of the relations defined by users, but prioritizes relations with high similarity scores, and returns only the top k, which are relations that were repeatedly selected by users. Similarly to the generation of dynamic maps, this process is not limited to images and is suitable for many types of high dimensional data such as video segments, 3D meshes, text documents and more.

The generated similarity measure, or k-nn graph, can also be used outside the context of dynamic maps. A global distance metric between every two elements in the dataset can be defined as the length of the shortest path between the two elements, or their geodesic distance on the associative k-nn graph. This generates an associative distance metric for all pairs of images in the dataset, which can be used for clustering, classification and many other applications. In contrast with associative similarity between images, the associative distance between two images which are significantly different is undefined, therefore this task cannot be done directly, even by a human observer, without computing the associative k-nn graph. Moreover, this method of producing the associative distance metric requires only a linear number of query answers from users, which in addition to crowdsourcing makes the solution suitable for massive datasets.

Conclusions

We conclude with a discussion of the merits of the present embodiments, along with an outlook for future work.

One of the most prominent features of the present approach is locality. The k nearest neighbors technique and the greedy map generation process accomplish scalability, and as a result permit work with massive data sets. There are certain attributes, such as distance, which are not preserved, and altogether the present solution cannot be posed as one that globally solves a well defined optimization problem on a high dimensional space. Rather, the present embodiments navigate through low dimensional pseudo-manifold representations of the original image space, and rely on user input to scan through the images until satisfied. A potential limitation of this approach is that we cannot easily assess the quality of the outcome, and cannot rigorously prove optimality or near optimality. Moreover, it is difficult to even define a notion of optimality in this framework.

Altogether, the present embodiments are suitable for the type and scale of the problem of a large dataset. The present method is computationally inexpensive, highly scalable, flexible and dynamic. The following elaborates on these aspects.

Computational Cost.

The local nature of the algorithm yields an efficient computational procedure. Since we consider an open-loop search, computing a global solution may be computationally prohibitive and may present an over-constrained problem that leads to many local conflicts, resulting in a solution that is not necessarily better than a solution obtained by applying a local search. Our approach is linear in the number of images, with a fairly small constant, which depends on the number of nearest neighbors and other factors, all yielding modest factors. By contrast, typical techniques involving relevance feedback are much slower. Taking into consideration the massive size of image repositories, a computationally inexpensive approach which nonetheless produces high quality results, is critical.

Flexibility.

The present method is dynamic, has a small number of constraints and a high degree of flexibility, and can handle frequent changes in the datasets. The local nature of the algorithm allows for a seamless addition of images, and other onthe-fly changes. Such flexibility cannot easily be accomplished in other techniques that aim to preserve global features. As previously described, the present system provides immediate and continuous interactive feedback that does not require the user to make selections based on a sequential search, but rather asks the user to visually choose a direction to follow based on general perceptive cues.

User Experience.

The present embodiments offer a different kind of experience from other relevance feedback methods. Rather than asking the user to engage in an iterative cycle of going over all images, selecting the relevant (or irrelevant) ones, and going over them again, the present embodiments provide the user with an intuitive tool to navigate through the image space and refine the search in the direction he or she chooses. To provide a good user experience, the present embodiments provide that the interaction in terms of navigation is fluid. Current experience, based on the initial evaluation discussed hereinabove, suggests that the user's exploration experience is smooth, fast, and pleasant. Users like the ability to browse through similar images and like the interaction capabilities, which are deemed to be intuitive and easy to master.

A goal of the dynamic map is to aid the refinement of image search. As such, the present embodiments may be used in tandem with keyword image search. In such a setup, the dynamic map may be seeded around an image which is the best match for the textual keyword search, to provide the user with a variety of images that resemble the best match.

The technique can be used as-is for any high-dimensional data such as video segments, 3D meshes, text documents and more. It can easily be combined with text based querying system, to refine text based search results.

The present technique, which may be classified as a member of the emerging family of relevance feedback methods, is powerful in the sense that it enjoys the benefits offered by this class of methods, while alleviating inherent difficulties that these methods often have, such as computational cost, scalability, and the extent of burden on the user.

It is expected that during the life of a patent maturing from this application many relevant techniques for generating a dynamic map will be developed and the scope of the terms "dynamic map" and "generating" are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of mapping a collection of items of high dimensional data, said high dimensional data being any of images or text documents or three dimensional objects or higher than three dimensional objects, onto a navigable grid for browsing, said browsing being via a user interface: the method comprising:

obtaining for respective items of said collection a list of nearest neighbor items and scores indicating degrees of similarity between a respective item and each of said listed nearest neighbors, said scores being based on item content;

placing a first item of said collection on a first cell within said navigable grid;

from a respective list of nearest neighbor items of said first item of said collection, selecting items from said list to place on a given cell, said items being selected to maximize a compatibility score with items already placed on neighboring cells of said given cell of said grid, said maximizing using respective similarity scores; and as a user pans across said grid in a pan direction to reveal additional cells, taking an item placed in said pan direction and obtaining a further list of nearest neighbor items for said item placed in said pan direction and placing items of said list on neighboring cells of said placed item according to scores indicating degrees of similarity between said items of said list and respectively placed neighboring items, said scores being based on item content, and continuing to obtain new lists and place further items on said grid at cells revealed by said panning, by said maximizing of respective compatibility scores, until all cells visible to a user are filled with items.

2. The method of claim 1, further comprising only generating a part of said grid currently visible to a user on a screen.

3. The method of claim 2, comprising allowing a user to move said grid to expose further cells, and filling said newly exposed cells with further items maximizing said compatibility score, said filling being carried out dynamically as said user exposes respective cells.

4. The method of claim 3, wherein said panning comprises exposing cells adjacent to current cells.

5. The method of claim 3, wherein said moving said grid comprises zooming in, to expose cells in between current cells, or zooming out, to hide some of said current cells.

6. The method of claim 1, wherein said compatibility score comprises a weighted sum of similarity scores for each neighbor that appears in the respective list of nearest neighbor items.

7. The method of claim 6, wherein said items comprise images and said similarity scores are computed from at least one member of the group consisting of: average color over predefined item segments, a joint color histogram, and a spatial envelope.

8. The method of claim 1, further comprising placing additional items at predefined locations on said grid to constrain said grid, or allowing a user to place additional items at selected locations on said grid to constrain said grid.

9. The method of claim 1, wherein said list of nearest neighbors items is limited to a predetermined number of items irrespective of a total number of items.

10. The method of claim 1, further comprising enhancing said compatibility score for a given item by including neighbors of neighboring cells.

11. The method of claim 1, wherein the items are images, the method further comprising:

using average color over predefined item segments, a joint color histogram, and a spatial envelope to generate a high dimension image descriptor; and using a locality sensitive hashing scheme (LSH) based on said high dimension image descriptor to group said images as nearest neighbors.

12. The method of claim 1, further comprising allowing users to reposition items on said grid, said user repositioning being allowed to override said similarity scores, thereby to provide crowdsourcing based enhancement for said grid.

13. A method of interactively browsing items on a screen, the items being from a collection of high dimensional items including text documents, images, and three- and-higher dimensional objects, and being dynamically mapped to a grid during said browsing, the method comprising:

In advance of said browsing:

obtaining for respective items of said collection a list of nearest neighbor items and scores indicating degrees of similarity between ones of said respective items and each of said listed nearest neighbors, said scores being based on item content;

placing a first of said respective items of said collection on a cell within a grid;

during said browsing:

allowing a user to pan through said grid to reveal additional cells of said grid, placing said additional cells of said grid on an interactive user screen and for each of said cells currently on said screen and not having items assigned thereto:

from a respective list of nearest neighbor items of a neighboring placed item, finding items that maximize a compatibility score with neighboring items already placed on said grid, said maximizing using respective similarity scores; and placing respectively found items on neighboring cells on said grid; and continuing to place further items on said grid, by said maximizing of respective compatibility scores, until all cells currently on said screen and visible to a user are filled with items.

14. A computerized device having a memory and a display, for browsing items according to similarity, said browsing being via a user interface, the device comprising:

said user interface;

a grid of cells, each cell having a first number of nearest neighbors, a subset of said cells being visible to a user on said screen at any given time, said grid being navigable via user interaction through panning and zooming to reveal new cells not currently visible on said screen;

an item placer configured to place a seed item in one of said cells for display via said screen;

said item placer further configured to subsequently place further items in neighboring cells of said visible subset for display via said screen, said further items being selected to minimize a distance metric with all currently placed neighboring items, said distance metric being based on item content;

said item placer continuing to place additional items on new cells as the new cells are revealed on said screen by said user interaction, said further items also being selected to minimize said distance metric with all already placed neighboring items, thereby to allow dynamic browsing of said items on said screen using said interface.

15. The device of claim 14, wherein said item placer is configured to be provided with items and corresponding k nearest neighbor lists for placing in said cells.

16. The device of claim 14, wherein said items are images.

17. The device of claim 14, further configured to allow users to reposition items on said positions, said user repositioning being allowed to override said similarity scores, thereby to provide crowdsourcing based enhancement for said images.

18. The device of claim 14, further comprising a random jump input for causing said currently visible subset to jump to a new randomly chosen seed image.

19. The device of claim 14, configured to carry out zooming by designating high level items for display in a low zoom and inserting items in between said high level items in accordance with said minimizing of said distance metric.

20. The device of claim 14, wherein said item placer is configured to use results from a keyword search to carry out said placing of said seed item.

21. The device of claim 14, wherein said item placer is configured to use results from a keyword search to filter items placed in said cells.

* * * * *